(12) United States Patent
Kotacka et al.

(10) Patent No.: US 8,743,459 B2
(45) Date of Patent: Jun. 3, 2014

(54) OPTICAL SECURITY DEVICE OFFERING 2D IMAGE

(75) Inventors: Libor Kotacka, Husinec-Rez (CZ); Petr Vizdal, Husinec-Rez (CZ); Vladimir Kolarik, Husinec-Rez (CZ); Lukas Danek, Husinec-Rez (CZ)

(73) Assignee: Optaglio SRO (CZ)

( * ) Notice: Subject to any disclaimer, the term of this patent is extended or adjusted under 35 U.S.C. 154(b) by 779 days.

(21) Appl. No.: 12/095,278

(22) PCT Filed: Dec. 1, 2006

(86) PCT No.: PCT/EP2006/069234
§ 371 (c)(1),
(2), (4) Date: Dec. 15, 2008

(87) PCT Pub. No.: WO2007/063137
PCT Pub. Date: Jun. 7, 2007

(65) Prior Publication Data
US 2009/0153967 A1    Jun. 18, 2009

(30) Foreign Application Priority Data
Dec. 1, 2005 (GB) .................................. 0524560.0

(51) Int. Cl.
*G02B 5/18* (2006.01)
*G03H 1/00* (2006.01)
*B42D 15/00* (2006.01)

(52) U.S. Cl.
USPC ................................. 359/567; 359/2; 283/86

(58) Field of Classification Search
CPC ...... G02B 5/18; G02B 5/1828; G02B 5/1842; G03H 1/0011; B42D 15/10; B42D 15/105; B42D 15/2035; G07D 7/06; G07D 7/0013

USPC ........ 359/2, 566–567, 569, 571–576; 283/86; 264/1.1–2.7
See application file for complete search history.

(56) References Cited

U.S. PATENT DOCUMENTS

| | | | |
|---|---|---|---|
| 5,428,479 A * | 6/1995 | Lee | 359/567 |
| 5,909,313 A * | 6/1999 | Lee | 359/569 |
| 6,088,161 A * | 7/2000 | Lee | 359/567 |
| 2003/0151786 A1 * | 8/2003 | Drinkwater | 359/15 |
| 2006/0274392 A1* | 12/2006 | Schilling et al. | 359/13 |
| 2007/0216975 A1* | 9/2007 | Holmes | 359/2 |

FOREIGN PATENT DOCUMENTS

| | | |
|---|---|---|
| WO | WO02/091041 A | 11/2002 |
| WO | WO 02091041 A1 * | 11/2002 |
| WO | WO 2004113953 A2 * | 12/2004 |
| WO | WO2005/103771 A | 11/2005 |

* cited by examiner

*Primary Examiner* — Stephone B Allen
*Assistant Examiner* — Kimberly N Kakalec
(74) *Attorney, Agent, or Firm* — Kilpatrick Townsend & Stockton LLP (57) ABSTRACT

The present invention provides for a diffractive element comprising a diffractive optical microstructure consisting of a modulated structure of a diffractive type which upon illumination by diffused ambient light creates a two-dimensional image to be viewed by an observer upon tilting or rotating the device or by varying lighting direction, wherein the diffractive modulated structure of the device consists of various generally parameterised special optical elements with specifically prescribed groove shapes, wherein each groove shape, position, center(s), and line thickness, are described by functions describing those dependencies which are variables of the positional coordinate of the optical element.

17 Claims, 7 Drawing Sheets

OPTICAL SECURITY DEVICE OFFERING 2D IMAGE

The present invention relates to a diffractive security element, and to a method of creating a two-dimensional image for use, in particular, in such element.

Axicons and diffractive lenses have been exploited for diffractive security elements for many years as is well known from Rudolf L. van Renesee, "Optical Document Security", Second Edition, Artech House, 1998 and Jorge Ojeda-Castaneda, Carlos C. Gomez-Reino (Eds.), "Selected Papers on Zone Plates", MS128, SPIE, 1996.

However such know security elements exhibit disadvantages and limitations.

The present invention seeks to provide for a diffractive security element, and method of creating a two-dimensional image, having advantages over known such elements and methods.

In particular, the present invention seeks to provide for a diffractive security element which is simple to recognize and relatively easy to observe even under poor illumination conditions contrary to classical holography and diffractive gratings. Such element can be easily checked preferably by the naked eye. This feature can mainly imitate variations of lenses and axicon, thus creating a curiosity shape perception or white light spectrum decomposition.

In accordance with one aspect, the present invention concerns a method of creating a two-dimensional image and its character of the image, a diffractive element and a method of creating the same, and particularly to a security diffractive element designed for example to protect bank notes, coins, credit cards, identification cards, documents or other valuable items, products etc. The application for this image methodology is primarily in the field of optical security devices where it can be used alone or in combination with other forms of diffractive or holographic security image.

The application relates in particular to the specific character of a two-dimensional image consisting of parameterized special optical elements, a diffractive element and method of creating the same and its applications in the field of optical security devices.

The present invention seeks to introduce a new visual diffractive optics based security element with an immediate public recognition being wide-angle observed, contrary to classical holography, even under relatively poor illumination.

One object of invention can be achieved by a method of creating a new form of security diffractive optical microstructure which replays a two-dimensional image, especially imitating and/or depicting pictures consisting of numerous geometrical objects, as circles, ellipses, squares, triangles, further letters or figures or other complex graphical motifs and their various graphical combinations.

Accordingly the present invention can provide for a security diffractive optical microstructure, where a structure comprising of an assembly of diffraction zones is created. The particular diffractive zones are occupied by specifically parameterized special optical elements, either diffractively originated lenses or diffractive axicons or their various combination. The zones thus organized in such a manner creating an overall picture, naked eyes observable.

Parameterized special optical elements are understood to be diffractive lenses having parameterized their rudimentary optical parameters as, e.g. focus/foci, geometrical shape (thus boundary) circular, elliptical, or being situated in a squared motif or other having other generally defined boundary. The order and shape of successive grooves thus creating the lens can be artificially reorganized to yield very peculiar shapes. This can even create a fluent transition among various special optical elements. Other parameterized special optical element exploited here is a general axicon grating. Axicon gratings have parameterised their period with a standard step of 50 nm, starting at sub-wavelength values. Other properties are spatially modified basic geometrical features of the axicons, e.g. centers of each group following a specifically given mathematical prescription. Finally the axicons being spatially limited by any general curve. All the special optical elements can be spatially modulated.

A combination with other standard diffractive elements, such as linear, crosses and rotational gratins can also be achieved. This is rather used to distinguish boundaries between neighboring elements. The special elements may fulfil any fractional part of the motif. Numerous combinations are achieved.

The structure bears a general, simple, well-known motif that is easy to recognize (e.g. a letter(s) and/or figure or other geometrical motif) laced in a surround. The motif as well as the surround can comprise any combination of the parameterized special optical elements. When observing the diffractive structure generally regardless of the lighting conditions, the motif is noticeable as being accompanied by a spectrum of a light according to the parameters of each special optical elements. Different optical/diffractive behavior of each zone or organized in such a way to depict the desired motif immediately.

The invention is described further hereinafter, by way of example only, with reference to the accompanying drawings in which.

Figure 1:
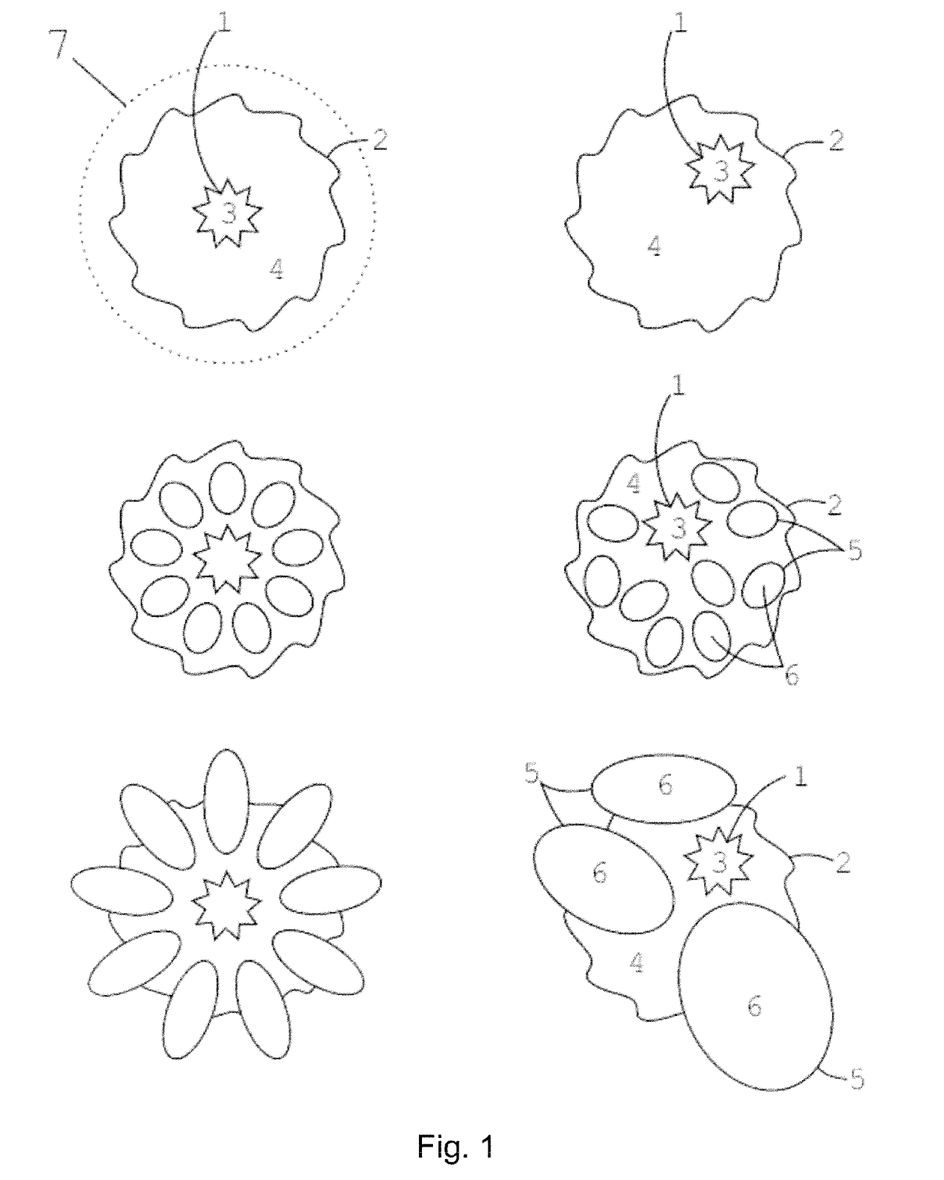
FIGS. 1 to 6 illustrate variations of 2-D image formed according to embodiments of the present invention.

Turning first to FIG. 1, there is illustrated a diffractive security device 7 divided into several elements in a plane (further a plane defined in Cartesian Coordinates x-y, as usual). This device consists of a border element 2 and its inner area 4 as its very basic variant. The area is fulfilled by generalized grating grooves having geometrical parameters thus specific for the diffraction of light or related wave optics phenomena. Further, the device 7 can consist of several elements of similar nature. The area 4 demarked via a general curve 2 contains another element and/or elements defined in the same manner as the inner area 4 and border element 2. Namely, areas 3, 6 bounded by curves 1, 5 and so on. The shapes of those curves, and thus the borders of entire areas, can contain arbitrary shapes, usually defined through simple or even complicated mathematical curves, but not exclusively (circles, ellipses, triangles, stars, simple contour-like graphics and many others). Each element, i.e. areas of particular elements is created through either diffractive lens (rather known as Fresnel zonal construction) or axicon(s) or rudimentary diffractive gratings or non-diffractive structures or dispersors and any mutual variations of all diffractive or quasi-diffractive elements and devices just mentioned. All elements are considered to be binary or blazed. All those diffractive elements may have arbitrarily modified or specifically perturbed in a defined way any of the parameters principally defining their macroscopic shape (1), (2), (5) as well as their microscopic-diffractive properties as radii, positions of the origins, curvature of each particular groove/line and their various mutual relations. The relations of these specific geometrical properties and parameters of those elements are mostly defined with a help of any known elementary and special mathematical functions (continuous, discrete), fractals or even arbitrarily chosen shapes (continuous, discrete).

Upon illumination with white incident light, the security element produces, for the naked eye, an observable effect of wide angle and independent of scale of illumination, enabling a recognition of the either mixed particular motifs 1, 5 or observation of known standard diffractive elements and/or their various modification. Each area 4, 3, 6, etc. can therefore yield a different perception while decomposing the white light. This element can be combined with any known diffractive and holographic element provided in particular as a security hologram or related product.

Figure 2:
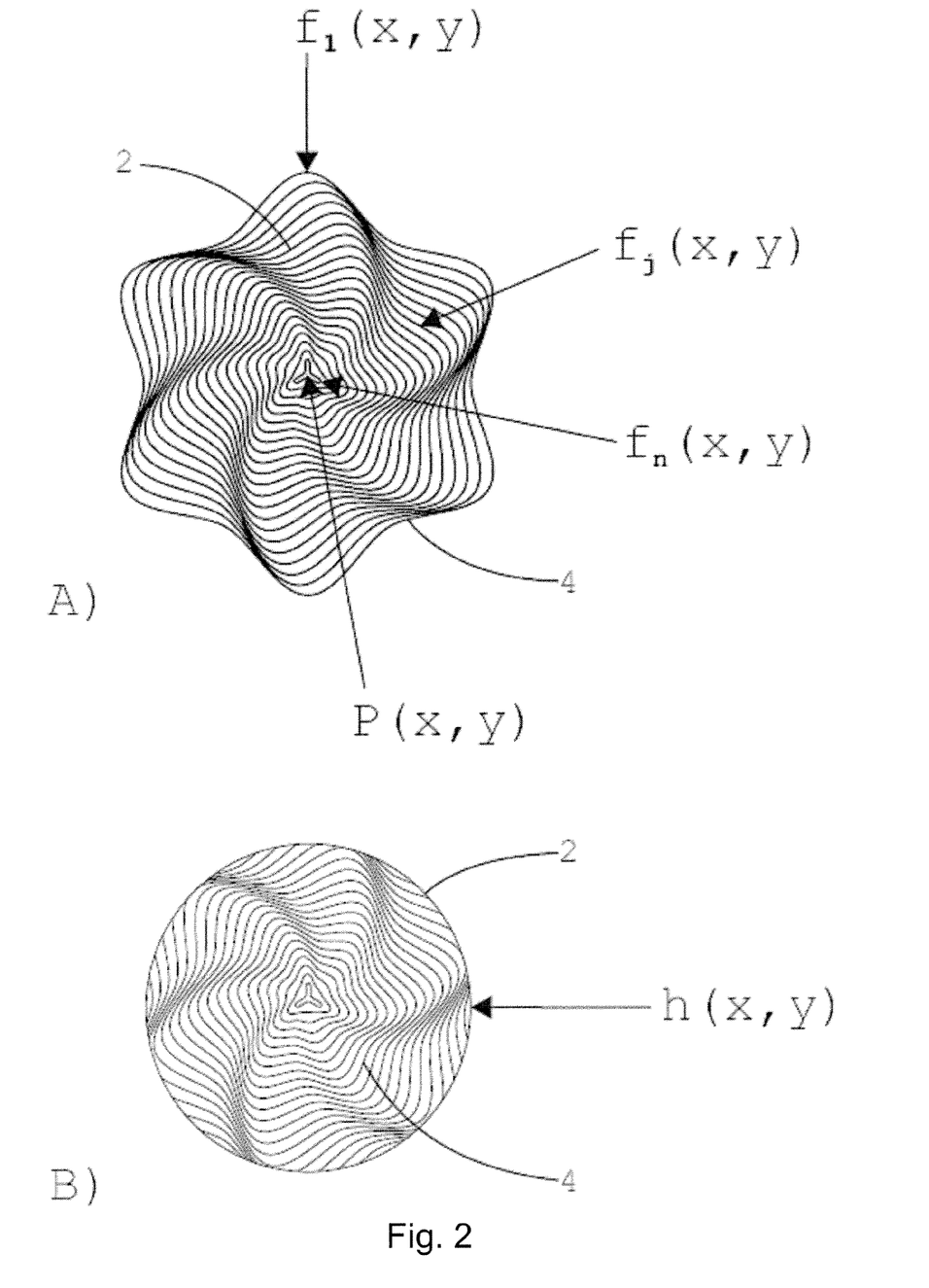

FIG. 2 shows a simple case of an area 4 determined by way of any curve 4, and having a certain central point P(x,y). The first generally defined groove obeys a function $f_j(x,y)$ and the j-th groove analogously obeys any function $f_j(x,y)$ etc., till $f_n(x,y)$. Any function $f_j(x,y)$ however does not need to relate to any function $f_k(x,y)$ different from $f_j(x,y)$. Case A involves $f_k(x,y)$ simultaneously defining the border line of this element. This border line can be defined though another set of functions $f_i(x,y)$. Case B shows the element demarked via a function h(x,y), which, in principle, can be absolutely different and mathematically independent of $f_j(x,y)$.

Figure 3:
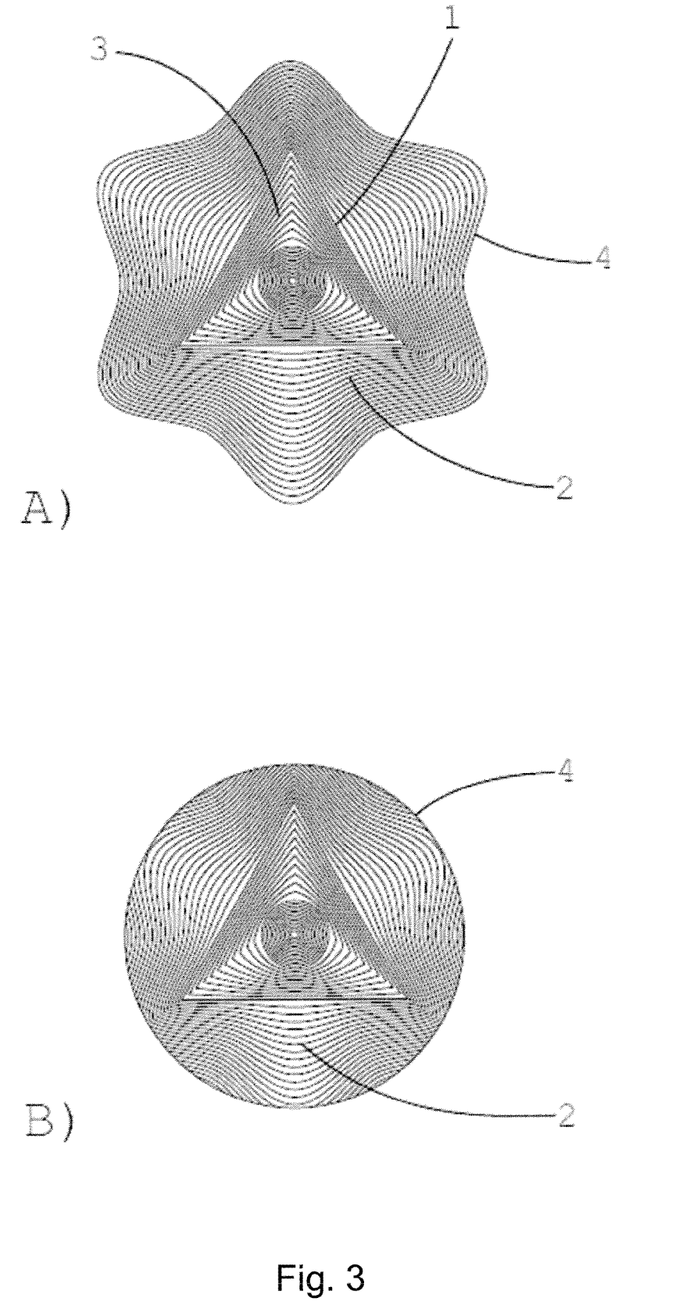

FIG. 3, analogously to FIG. 2 cases A and B, shows an arbitrarily nature of the successive grooves shape (containing also circular and triangular shape, as an example).

Figure 4:
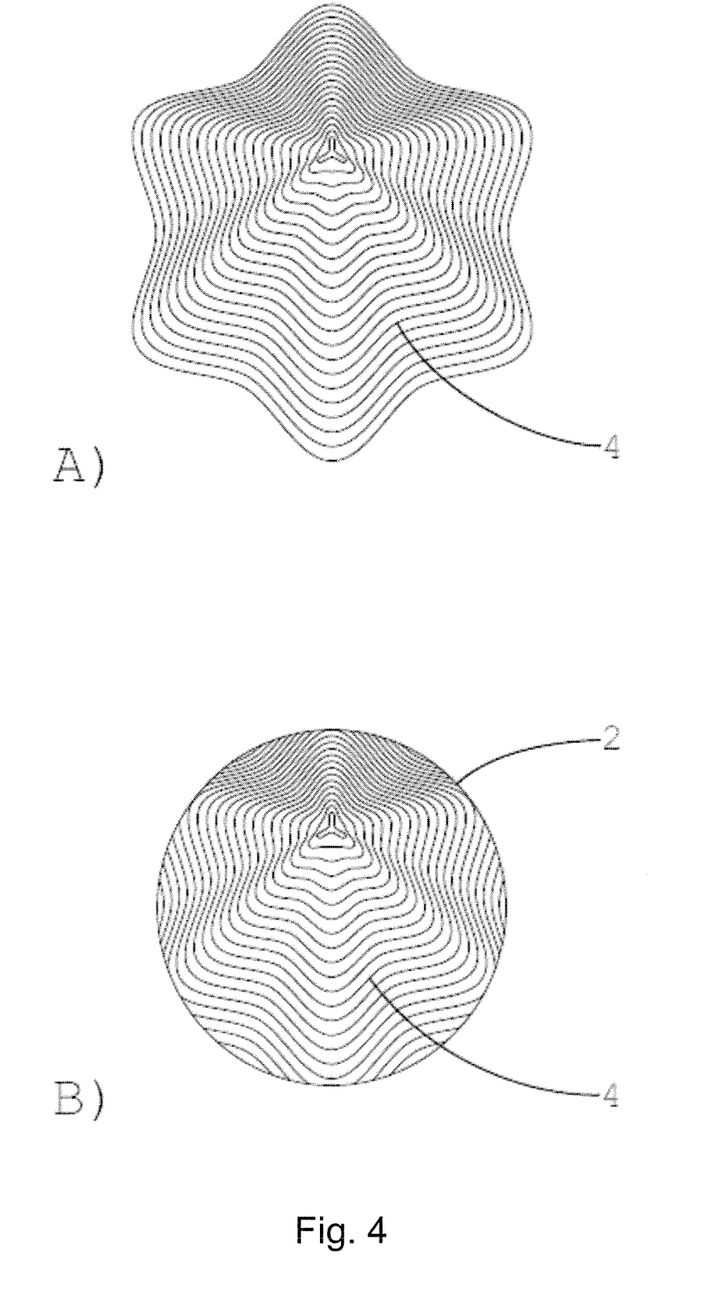

In the embodiment of FIG. 4, there is illustrated an apparent difference between the centre positions of the border function, i.e. either $f_j(x,y)$ in case A or h(x,y) in the case B.

Figure 5:
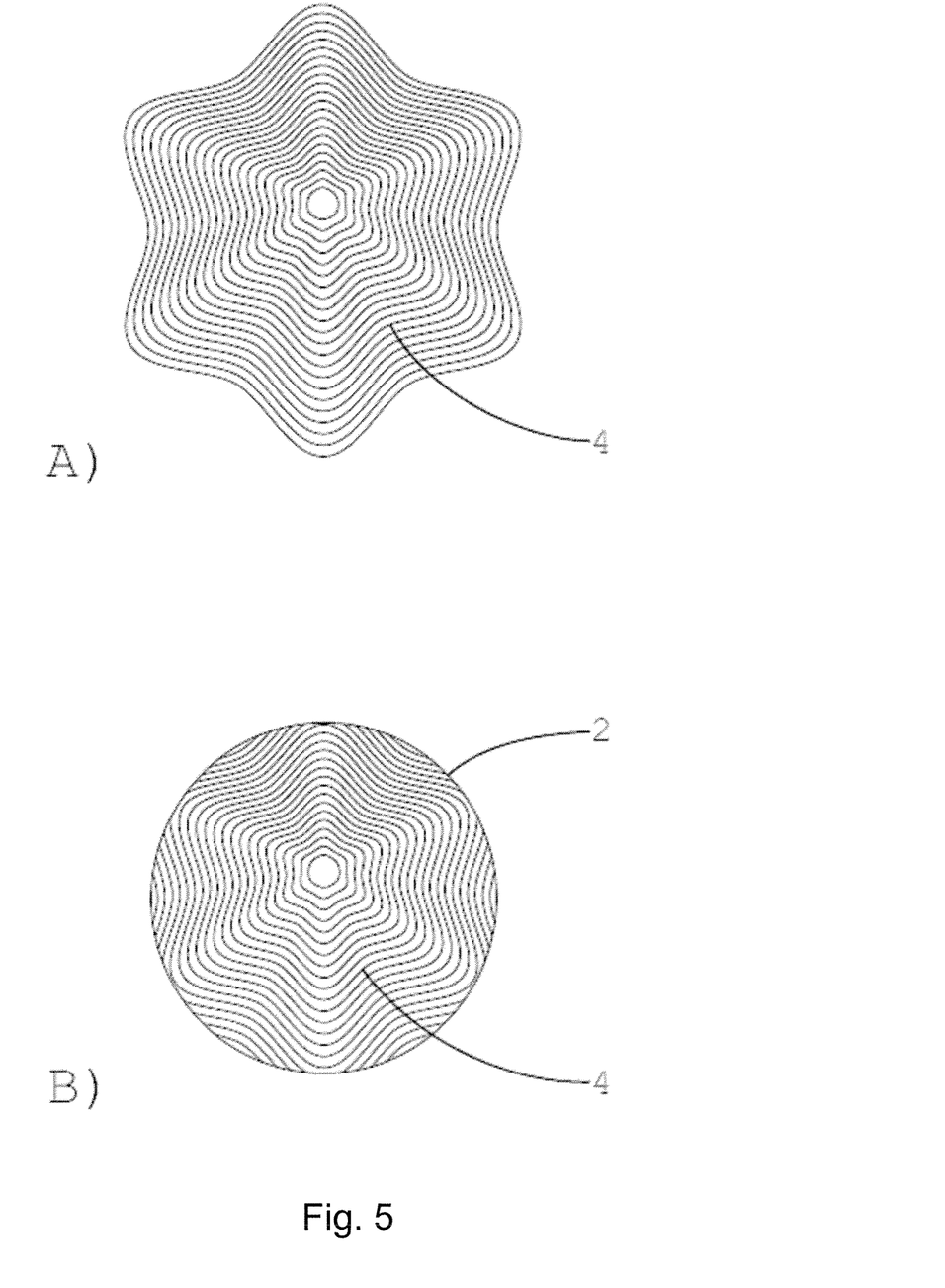

Yet further, FIG. 5 shows the variant on a classical grating, i.e. constant period among successive groove, those however arbitrarily shaped.

Figure 6:
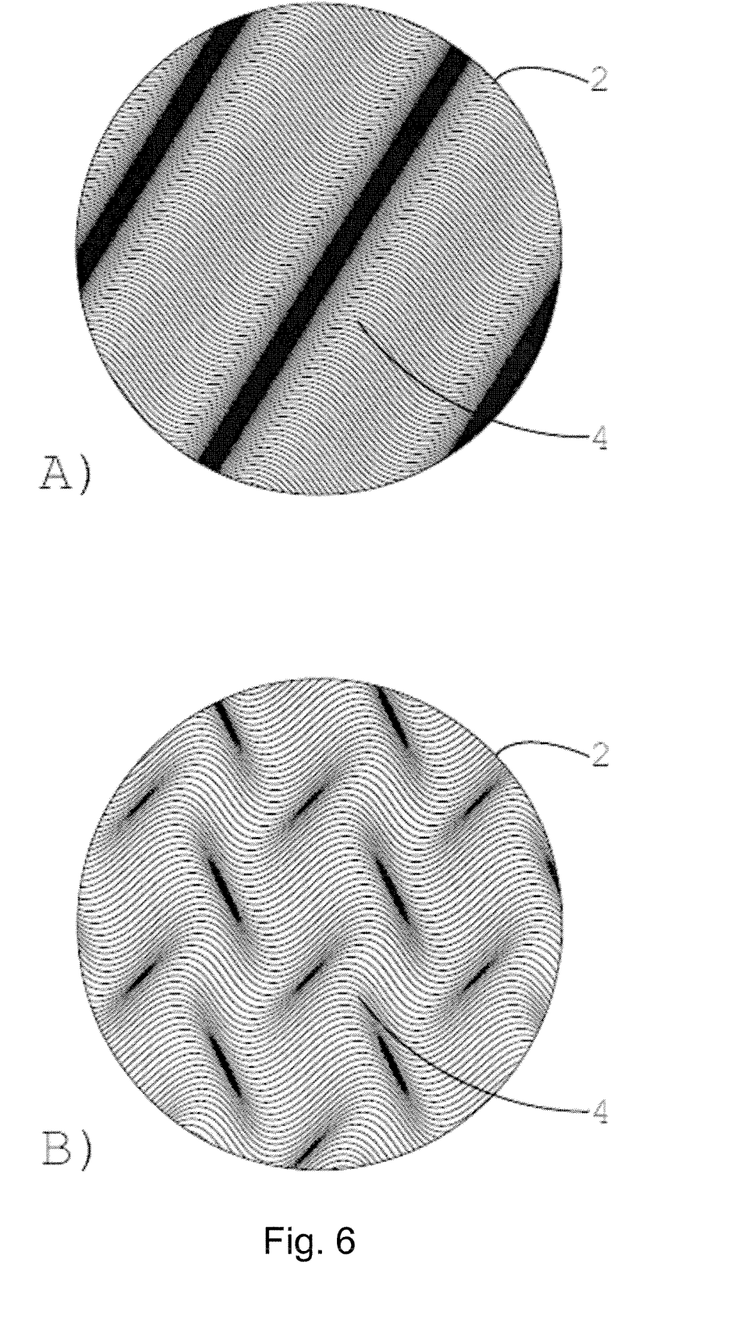

FIG. 6 show a structure demarked by a boundary 2 and an area (4) fulfilled by a grating-like structure generated via specifically exploited sine function, e.g. such as C+A sin(ax+b), where C, A, a, b are theoretically any real numbers.

Figure 7:
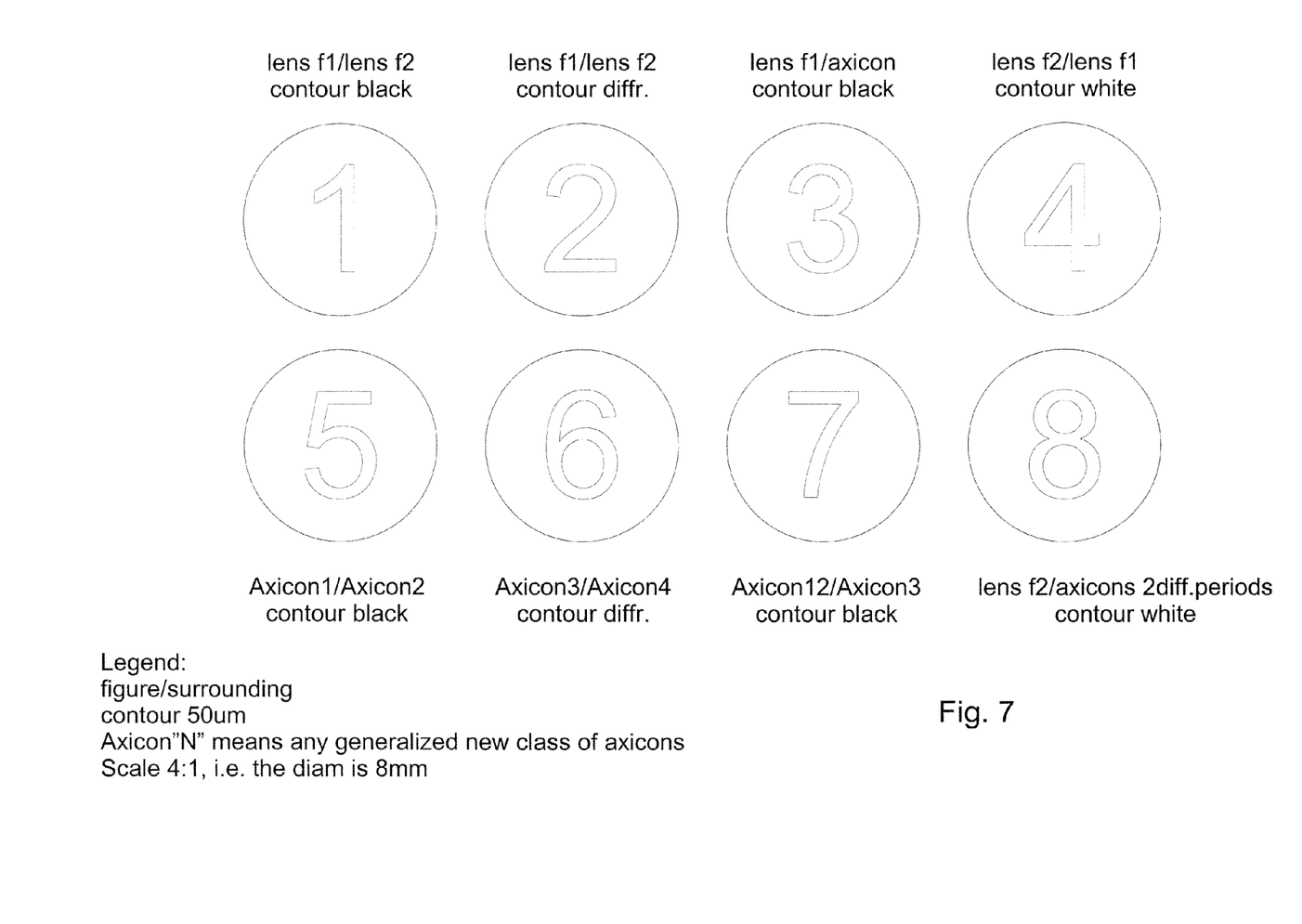
FIG. 7 illustrates a further example of an image device embodying the present invention.

With regard to the examples of FIG. 7, the structure bears a general, simple, well-known motif easy to recognize (e.g. a letter(s) and/or figure or other geometrical motif) laced in a surrounding. The motif as well as the surrounding can be any combination of the parameterised special optical elements. When observing the diffractive structure nearly regardless of conditions of lighting, one notices the motif itself being accompanied by the spectrum of a light according to the parameters of each special optical elements. Different optical/diffractive behaviour of each zone or organized in such a way to depict the desired motif immediately.

It can therefore be appreciated that the present invention provides for the creation of a two-dimensional image, especially imitating a simple geometrical motif, such that a microrelief or otherwise modulated structure of a diffractive type is created. The diffractive microrelief can consist of various generally parameterized special optical elements: diffractive lenses and/or axicons.

Further, the structure can yield a very unique and characteristic visual percept of the depicted motif according to the special optical elements exploited and examples of the invention are illustrated in the accompanying drawing.

The invention claimed is:

1. A diffractive element comprising a diffractive optical microstructure comprising a modulated structure of a diffractive type which upon illumination by diffused ambient light creates a two-dimensional image to be viewed by an observer upon tilting or rotating the device or by varying lighting direction, wherein the diffractive modulated structure of the device comprises a plurality of optical elements with specifically prescribed groove shapes combining to form a three-dimensional pattern of the structure, wherein any one of the grooves is described by a continuously varied parameterized functions employing at least two parameters which vary between the grooves of the structure to form the said three-dimensional pattern, wherein the parameters are selected from a group consisting of groove shape, position, center and line thickness, and wherein the functions further serving to describe functional dependencies which are variables of a positional coordinate of the optical element.

2. A diffractive security element as claimed in claim 1 wherein the optical microstructure comprises a microrelief structure.

3. A diffractive security element as claimed in claim 1, wherein the two dimensional image comprises a simple geometrical motif containing apparent movement or switching effects.

4. A diffractive security element as claimed in claim 1, wherein the optical elements include diffractive lenses.

5. A diffractive security element as claimed in claim 1, wherein optical elements include axicons.

6. A diffractive security element as claimed in claim 1, wherein the optical elements include any mathematically defined structure.

7. A diffractive security element as defined in claim 1 and which yields a unique and characteristic visual effect when seen by an observer under ambient lighting wherein the perception of the two-dimensional image motif according to the optical elements is exploited.

8. A diffractive security element as claimed in claim 1, and having diffractive lens or lenses, axicons and their various modifications as motifs thus mutually masked in one diffractive security element.

9. A diffractive security element as claimed in claim 1, wherein the optical elements comprise a combination of diffractive lenses that appear spherical and/or elliptical, and/or cylindrical and their mutual combination with of axicons.

10. A diffractive security element as claimed in claim 1 and arranged to yield a unique and characteristic visual perception of the two-dimensional image according to the optical elements exploited.

11. A diffractive security element as claimed in claim 1, wherein any of the elements overlap or merges.

12. A diffractive security element as claimed in claim 1, wherein two or more such elements appear as one security element.

13. A diffractive security element as claimed in claim 1, wherein the structure is embossed or UV embossed into reflective and/or transparent foils.

14. A diffractive security element as claimed in claim 1, and originated or embossed into metal platelets of any shape and size.

15. A diffractive security element as claimed in claim 1 wherein the optical elements have a parameterized period of 50 nm or greater.

16. A diffractive security device including an element as claimed in claim 1 combined with a diffractive and/or holographic element.

17. A method of creating a two-dimensional image, the method comprising:
providing a diffractive optical microstructure comprising a modulated structure of a diffractive type, wherein the diffractive modulated structure of the device comprises a plurality of optical elements with specifically prescribed groove shapes combining to form a three-dimensional pattern of the structure, wherein any one of the grooves is described by a continuously parameterized function employing at least two parameters which vary between the grooves of the structure to form the said three-dimensional pattern, wherein the parameters are selected from a group consisting of groove shape, position, center and line thickness, and wherein the functions further serving to describe functional dependencies which are variables of a positional coordinate of the optical element; and illuminating the diffractive optical microstructure while tilting or rotating the diffractive optical microstructure or by varying lighting direction to create a two-dimensional image to be viewed by an observer.

* * * * *